US012625000B2

(12) United States Patent
Rajesh et al.

(10) Patent No.: US 12,625,000 B2
(45) Date of Patent: May 12, 2026

(54) CALIBRATING AN INFRARED (IR) SENSOR IN A FIRE SENSING DEVICE

(71) Applicant: Honeywell International Inc., Charlotte, NC (US)

(72) Inventors: Vyshnavi Rajesh, Kannur (IN); Agnel Anto, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 268 days.

(21) Appl. No.: 18/197,168

(22) Filed: May 15, 2023

(65) Prior Publication Data

US 2024/0385045 A1    Nov. 21, 2024

(51) Int. Cl.
| | |
|---|---|
| *G01J 5/80* | (2022.01) |
| *G01J 5/00* | (2022.01) |
| *G01J 5/02* | (2022.01) |
| *G01J 5/60* | (2006.01) |
| *G06T 7/00* | (2017.01) |
| *H04N 23/12* | (2023.01) |

(52) U.S. Cl.
CPC ............. *G01J 5/0018* (2013.01); *G01J 5/025* (2013.01); *G01J 5/027* (2013.01); *G01J 5/601* (2013.01); *G01J 5/80* (2022.01); *G06T 7/97* (2017.01); *H04N 23/12* (2023.01); *G01J 2005/0077* (2013.01); *G06T 2207/10048* (2013.01)

(58) Field of Classification Search
CPC ....................................................... G01J 5/80
See application file for complete search history.

(56) References Cited

U.S. PATENT DOCUMENTS

| | | | |
|---|---|---|---|
| 6,388,449 B1 | 5/2002 | Ramsden | |
| 8,768,994 B2 | 7/2014 | Kuo et al. | |
| 11,200,697 B2 | 12/2021 | Sandsten et al. | |
| 2006/0126085 A1* | 6/2006 | Owen ................... | H04N 1/465 |
| | | | 358/1.9 |
| 2009/0075213 A1 | 3/2009 | Edelbrock | |
| 2010/0073477 A1* | 3/2010 | Finn .................... | G08B 17/125 |
| | | | 382/103 |
| 2010/0103005 A1 | 4/2010 | Nolan et al. | |

(Continued)

FOREIGN PATENT DOCUMENTS

| | | |
|---|---|---|
| CN | 114018416 A | 2/2022 |
| WO | 2020159165 A1 | 8/2020 |

OTHER PUBLICATIONS

Aragon , et al., "A Calibration Procedure for Field and UAV-Based Uncooled Thermal Infrared Instruments"; MPDI: Sensors, vol. 20 (Jun. 10, 2020) (24 pgs).

*Primary Examiner* — Uzma Alam
*Assistant Examiner* — Shun Lee
(74) *Attorney, Agent, or Firm* — Brooks, Cameron & Huebsch, PLLC

(57) ABSTRACT

Devices, methods, and systems for calibrating an infrared (IR) sensor in a fire sensing device are described herein. One device includes a camera configured to capture an image of an environment, an IR sensor configured to detect a radiation level of the environment, and a controller configured to compare a radiation level of the image of the environment captured by the camera to the radiation level of the environment detected by the IR sensor and calibrate the IR sensor based on the comparison.

12 Claims, 5 Drawing Sheets

(56) References Cited

U.S. PATENT DOCUMENTS

| 2010/0140477 | A1* | 6/2010 | Graf ................... | G01N 21/3504 |
| | | | | 702/24 |
| 2015/0028114 | A1* | 1/2015 | Rosen ................... | G05D 23/27 |
| | | | | 236/51 |
| 2015/0136430 | A1* | 5/2015 | Livchak ............. | F24C 15/2021 |
| | | | | 169/61 |
| 2022/0086370 | A1 | 3/2022 | Kuybeda et al. | |
| 2022/0222989 | A1 | 7/2022 | Xiao et al. | |

* cited by examiner

CALIBRATING AN INFRARED (IR) SENSOR IN A FIRE SENSING DEVICE

TECHNICAL FIELD

The present disclosure relates generally to devices, methods, and systems for calibrating an infrared (IR) sensor in a fire sensing device.

BACKGROUND

Large facilities, such as commercial buildings, office buildings, hospitals, and the like, as well as residential buildings, such as apartments, townhomes, single family homes, and the like may have a fire alarm system that can be triggered during an emergency situation (e.g., a fire) to warn occupants to evacuate. For example, a fire alarm system may include a fire control panel and a plurality of fire sensing devices (e.g., smoke detectors), located throughout the building (e.g., on different floors and/or in different rooms of the building) that can sense a fire occurring in the building (e.g., by detecting smoke) and provide a notification of the fire to the occupants of the building via alarms.

Maintaining the fire alarm system can include recalibration of the sensors of fire sensing devices of the system. Over time the sensors of a fire sensing device can drift out of a calibration due to environmental conditions. For example, infrared (IR) sensors used for flame detection can drift due to exposure to radiation. An IR sensor out of calibration can prevent a fire sensing device from detecting a flame.

Recalibration of sensors often requires tedious procedures and a significant amount of time. For example, a fire sensing device may have to be dismounted and shipped offsite for calibration that involves specialized calibration equipment by trained personnel.

DETAILED DESCRIPTION

Figure 1:
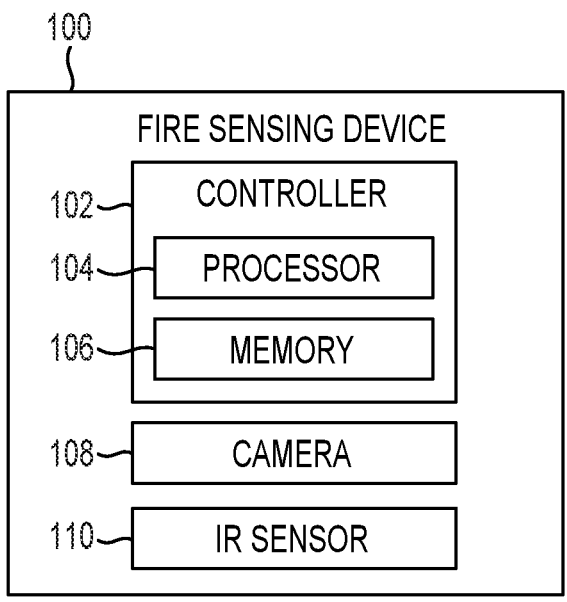
FIG. 1 illustrates a block diagram of a fire sensing device in accordance with an embodiment of the present disclosure.

Devices, methods, and systems for calibrating an infrared (IR) sensor in a fire sensing device are described herein. One device includes a camera configured to capture an image of an environment, an IR sensor configured to detect a radiation level of the environment, and a controller configured to compare a radiation level of the image of the environment captured by the camera to the radiation level of the environment detected by the IR sensor and calibrate the IR sensor based on the comparison.

In contrast to previous fire sensing devices in which a person (e.g., maintenance engineer and/or operator) would have to manually test and calibrate an IR sensor in a fire sensing device, a fire sensing device in accordance with the present disclosure can test and calibrate its IR sensor itself, without the involvement of a maintenance engineer or operator. For example, the fire sensing device can utilize a camera in the fire sensing device to determine when the fire sensing device is in extreme darkness, which means the IR sensor should record a value of zero. If the IR sensor records a value other than zero, this can indicate that the IR sensor needs to be recalibrated, and the value can be used to calibrate (e.g., recalibrate) the IR sensor. Accordingly, fire sensing devices in accordance with the present disclosure may test their IR sensor, recalibrate their IR sensor, and/or transmit an alert that the IR sensor is out of calibration, which can reduce the chance of the fire sensing device delaying or missing the detection of a fire.

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 100 may reference element "00" in FIG. 1, and a similar element may be referenced as 500 in FIG. 5.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 illustrates a block diagram of a fire sensing device 100 in accordance with an embodiment of the present disclosure. The fire sensing device 100 includes a controller (e.g., microcontroller) 102, a camera 108, and an IR sensor 110. Camera 108 can capture an image of an environment (e.g., the environment in which fire sensing device 100 is located), and IR sensor 110 can detect a radiation level of the environment.

Controller 102 can include a processor 104 and a memory 106. Memory 106 can be any type of storage medium that can be accessed by processor 104 to perform various examples of the present disclosure. For example, memory 106 can be a non-transitory computer readable medium having computer readable instructions (e.g., computer program instructions) stored thereon that are executable by processor 104 to calibrate the IR sensor 110 in the fire sensing device 100 in accordance with the present disclosure. For instance, processor 104 can execute the executable instructions stored in memory 106 to determine an environment (e.g., the environment in which the fire sensing device is located) has a radiation level equal to (e.g., at) or less than (e.g., below) a threshold radiation level based on an image captured by the camera 108 of the fire sensing device 100 (e.g., by comparing the radiation level of the image of the environment captured by the camera to the threshold radiation level), compare, responsive to determining the environment (e.g., the image of the environment) has a radiation level at or below the threshold radiation level, the radiation level to a radiation level of the environment detected by the IR sensor 110 of the fire sensing device 100, and calibrate the IR sensor 110 based on the comparison.

In some examples, the camera 108 can be used for flame detection. The camera 108 can be a camera that captures the image of the environment using visible light. For example, the camera 108 can capture the image of the environment in a red, green, and blue color space. The controller 102 can convert the image from the red, green, and blue color space to a number of hue saturation values and compare the number of hue saturation values to a number of hue saturation values detected by the IR sensor 110.

In a number of embodiments, the camera 108 can be a thermal imaging camera that captures a thermal image of the environment. Accordingly, the controller 102 can determine the radiation level of the thermal image of the environment.

The threshold radiation level can be the radiation level when the fire sensing device 100 is in extreme darkness, which can be a hue saturation value of 0%. Accordingly, the IR sensor 110, if calibrated, can have a hue saturation value of 0%. If the IR sensor 110 records a hue saturation value other than 0%, this can indicate the IR sensor needs to be calibrated, and the recorded hue saturation value can be used to calibrate (e.g., recalibrate) the IR sensor 110. Calibrating the IR sensor 110 can comprise compensating for a difference (e.g., calibration error) between the radiation level of the image captured by the camera 108 and the radiation level of the environment detected by the IR sensor 110 by adding a correction factor (e.g., an offset) to the radiation level of the environment detected by the IR sensor 110 equal to a difference between a hue saturation value of the image and a hue saturation value of the radiation level of the environment detected by the IR sensor 110.

In some examples, controller 102 can determine, responsive to the radiation level of the image of the environment captured by camera 108 being equal to or less than the threshold radiation level, an offset between the radiation level of the image and the radiation level of the environment detected by the IR sensor 110. Controller 102 can calibrate the IR sensor 110 based on the determined offset.

The camera 108 can capture an additional image of the environment responsive to the radiation level of the image of the environment captured by the camera 108 being greater than the threshold radiation level. The controller 102 can determine whether a radiation level of the additional image of the environment captured by the camera 108 is equal to or less than the threshold radiation level, determine, responsive to the radiation level of the additional image of the environment captured by the camera 108 being equal to or less than the threshold radiation level, an additional offset between the radiation level of the additional image of the environment captured by the camera 108 and the radiation level of the environment detected by the IR sensor 110, and calibrate the IR sensor 110 based on the determined additional offset.

In a number of embodiments, the controller 102 can predict an end of life of the IR sensor 110 based on calibration frequency of IR sensor 110. For example, if the IR sensor 110 is being calibrated frequently or if the calibration error is increasing over time, the controller 102 can extrapolate when the IR sensor 110 will fall out of its operational specification. A threshold offset can be the amount of offset needed to the radiation level of the environment detected by the IR sensor 110 to prevent the IR sensor 110 from falling out of its operational specification before a particular amount of time (e.g., before night arrives) to do another recalibration. If the offset to calibrate the IR sensor 110 (e.g., the offset between the radiation level of the image captured by camera 108 and the radiation level of the environment detected by the IR sensor 110) exceeds the threshold offset, the controller 102 can generate an alert (e.g., message) that the IR sensor 110 is at end of life. In some examples, the controller 102 can transmit the alert.

Figure 2:
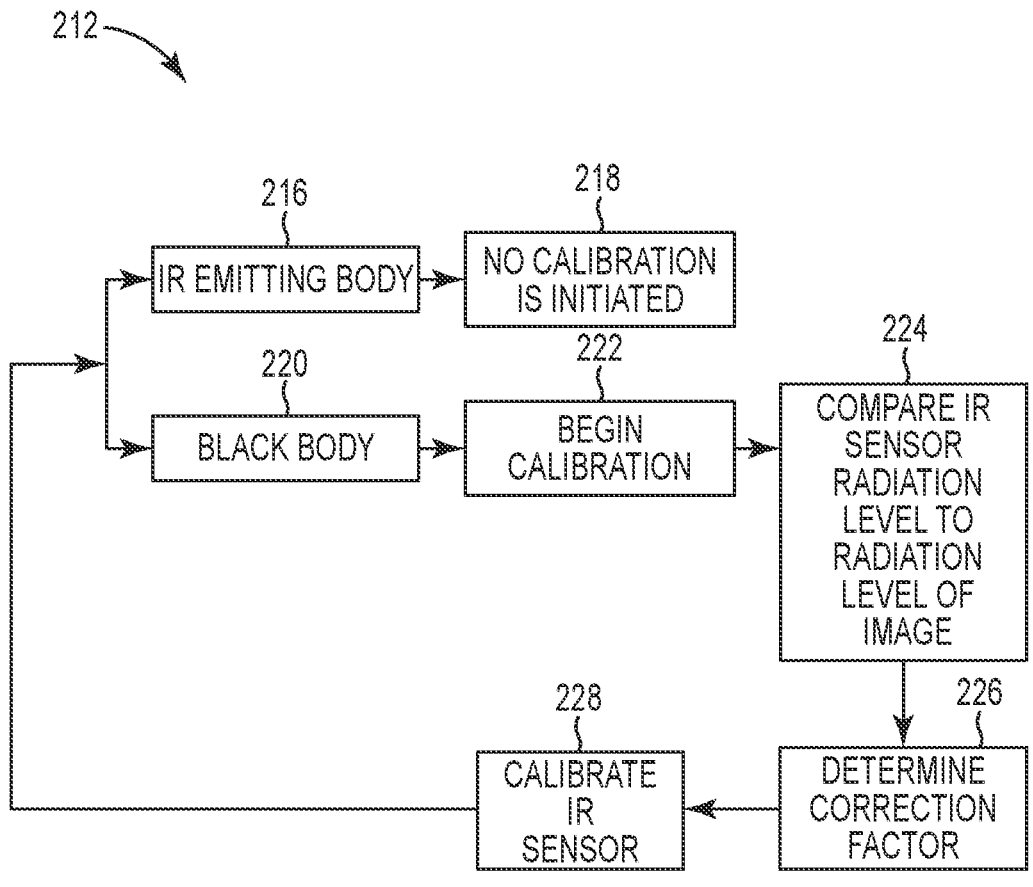
FIG. 2 illustrates a method flow diagram of a calibration of an IR sensor in a fire sensing device in accordance with an embodiment of the present disclosure.

FIG. 2 illustrates a method flow diagram 212 of a calibration of an IR sensor in a fire sensing device in accordance with an embodiment of the present disclosure. In some embodiments, the method illustrated in FIG. 2 can be performed by the fire sensing device previously described in connection with FIG. 1 (e.g., the IR sensor can be IR sensor 110 previously described in connection with FIG. 1).

At block 216, a controller (e.g., controller 102 described in connection with FIG. 1) can determine an image of an environment captured by a camera (e.g., camera 108 described in connection with FIG. 1) includes an IR emitting body. The controller can determine the environment includes an IR emitting body if the image includes any radiation or if the image includes a radiation level greater than a threshold radiation level. If the image includes an IR emitting body, no calibration is initiated, and the method concludes at block 218.

At block 220, the controller can determine the image of the environment includes a black body. The controller can determine the environment includes a black body if the image has no radiation or if the radiation level of the image is at or below the threshold radiation level. If the image includes a black body, the controller can determine the environment is ideal for calibration and calibration can begin at block 222.

An IR sensor radiation level can be compared to the radiation level of the image captured by the IR camera at block 224. Detecting the radiation level of the image will be further described herein (e.g., in connection with FIG. 3). A correction factor can be determined at block 226 based on the comparison.

The correction factor can be used to calibrate the IR sensor at block 228. Calibrating the IR sensor can compensate for the difference between the radiation level of the image captured by the camera and the radiation level of the environment detected by the IR sensor by adding an offset as the correction factor to the radiation level of the environment detected by the IR sensor. For example, the correction factor can be added to the radiation level of the environment detected by the IR sensor equal to a difference between a hue saturation value of the image and a hue saturation value of the radiation level of the environment detected by the IR sensor.

Figure 3:
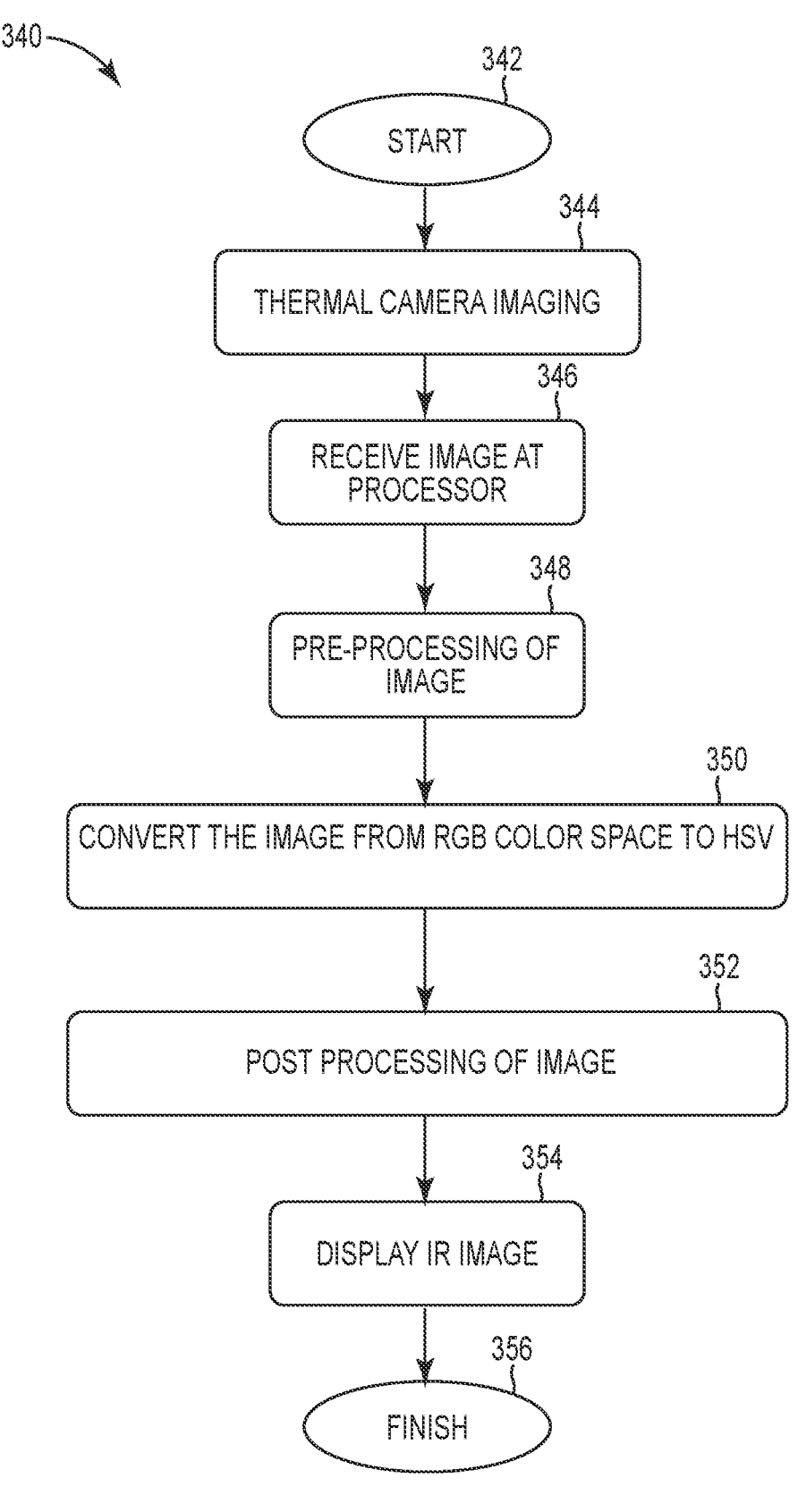
FIG. 3 illustrates a method flow diagram of detecting an IR radiation level of an image captured by a camera in a fire sensing device in accordance with an embodiment of the present disclosure.

FIG. 3 illustrates a method flow diagram 340 of detecting an IR radiation level of an image captured by a camera in a fire sensing device in accordance with an embodiment of the present disclosure. In some embodiments, the method illustrated in FIG. 3 can be performed by the fire sensing device previously described in connection with FIG. 1 (e.g., the camera can be camera 108 previously described in connection with FIG. 1).

At block 342 a calibration (e.g., the calibration previously described in connection with FIG. 2) can start. A camera (e.g., camera 108 described in connection with FIG. 1) can capture an image of an environment using thermal camera imaging at block 344. The camera can capture the image in a red, green, and blue color space.

A processor (e.g., processor 104 described in connection with FIG. 1) can receive the image at block 346. The processor can pre-process the image at block 348. The pre-processing can include reading, denoising, and/or resizing the image. The processor can further convert the image from the red, green, and blue (RGB) color space to hue saturation values (HSV) to define a range of black color at block 350.

At block 352, post processing of the image can be performed by the processor. For example, the processor can determine whether the image includes an IR emitting body by comparing the hue saturation values of the image to hue saturation values of an image without an IR emitting body (e.g., without radiation) or hue saturation values of an image with radiation under a threshold radiation level. In some embodiments, the processor can determine the image includes an IR emitting body if a number of hue saturation values of the image are greater than a threshold hue saturation value.

The IR image can be displayed at 354 and the method can conclude at block 356. The IR image can then be used to calibrate the IR sensor, as described in connection with FIG. 2.

Figure 4:
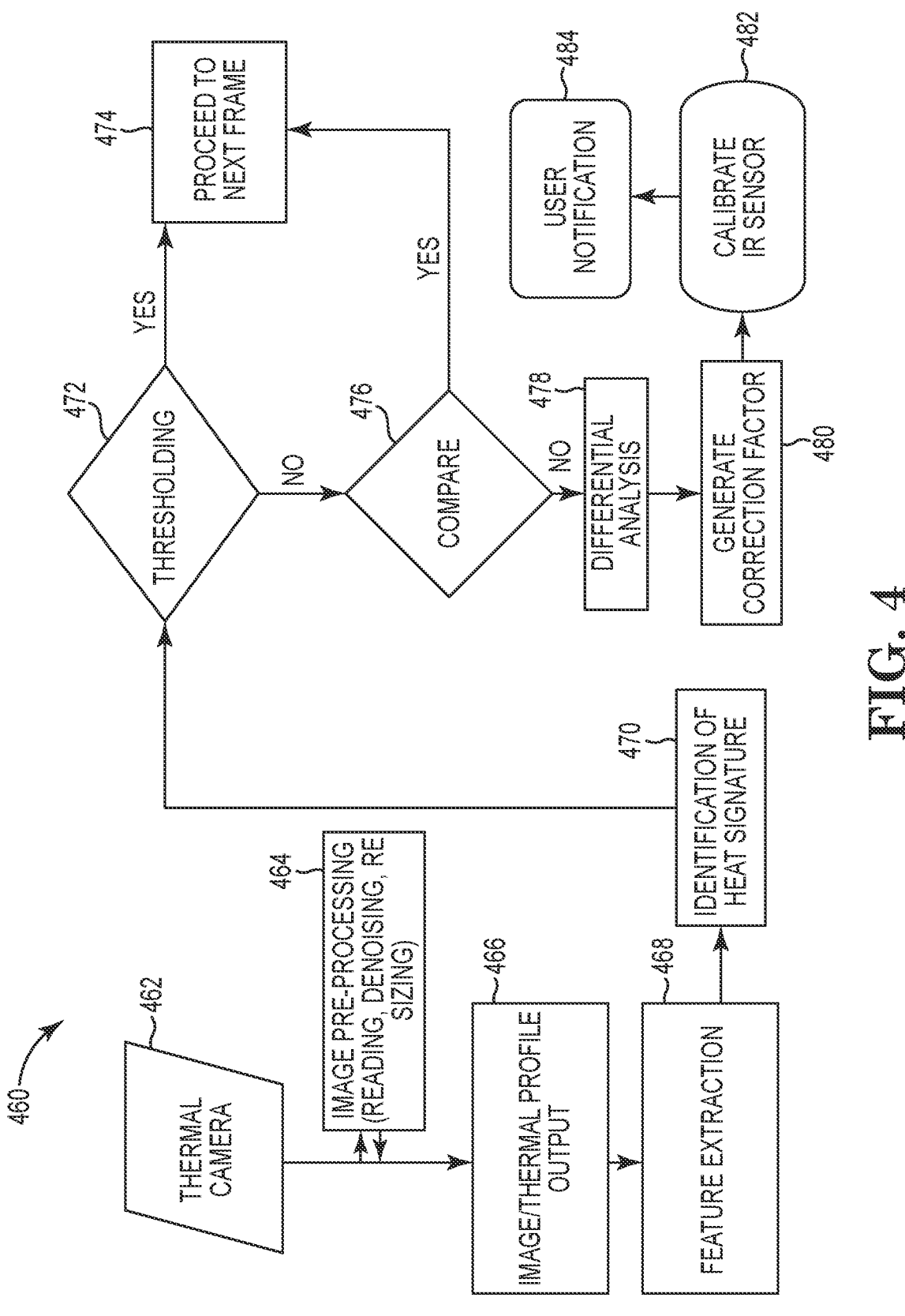
FIG. 4 illustrates a method flow diagram of a calibration of an IR sensor in a fire sensing device in accordance with an embodiment of the present disclosure.

FIG. 4 illustrates a method flow diagram 460 of a calibration of an IR sensor in a fire sensing device in accordance with an embodiment of the present disclosure. In some embodiments, the method illustrated in FIG. 4 can be performed by the fire sensing device previously described in connection with FIG. 1 (e.g., the IR sensor can be IR sensor 110 previously described in connection with FIG. 1).

A camera (e.g., camera 108 described in connection with FIG. 1), such as, for example, a thermal camera can capture an image of an environment at block 462. The camera can execute image pre-processing including reading, denoising, and/or resizing at block 464.

The camera can output an image and/or a thermal profile at block 466 after the image pre-processing. The image and/or thermal profile can be output to a controller (e.g., controller 102 described in connection with FIG. 1) of the fire sensing device. The controller can execute feature extraction at block 468 to identify a heat signature (e.g., radiation level) of the image at block 470.

At block 472, the controller can determine whether the environment has a radiation level greater than a threshold radiation level based on the image captured by the camera by comparing the radiation level of the image to the threshold radiation level. If the environment in the image has a radiation level greater than the threshold radiation level, the controller can proceed to the next frame (e.g., the next image) captured by the camera at block 474.

If the environment in the image has a radiation level at or below the threshold radiation level, the controller can compare the radiation level of the image to a radiation level of the environment detected by an IR sensor (e.g., IR sensor 110 described in connection with FIG. 1) of the fire sensing device at block 476. If the radiation level of the IR sensor is at or within a threshold range of the radiation level of the image, the controller can proceed to the next frame at block 474.

At block 478, the controller can perform a differential analysis by calculating the difference between the radiation level detected by the IR sensor and the radiation level of the image if the radiation level detected by the IR sensor is greater than or outside of the threshold range of the radiation level of the image. The controller can generate a correction factor based on the difference at block 480 and calibrate the IR sensor using the correction factor at block 482. In some examples, a user notification can be transmitted at 484 in response to updating the calibration values of the IR sensor to inform the user that the IR sensor has been calibrated.

Figure 5:
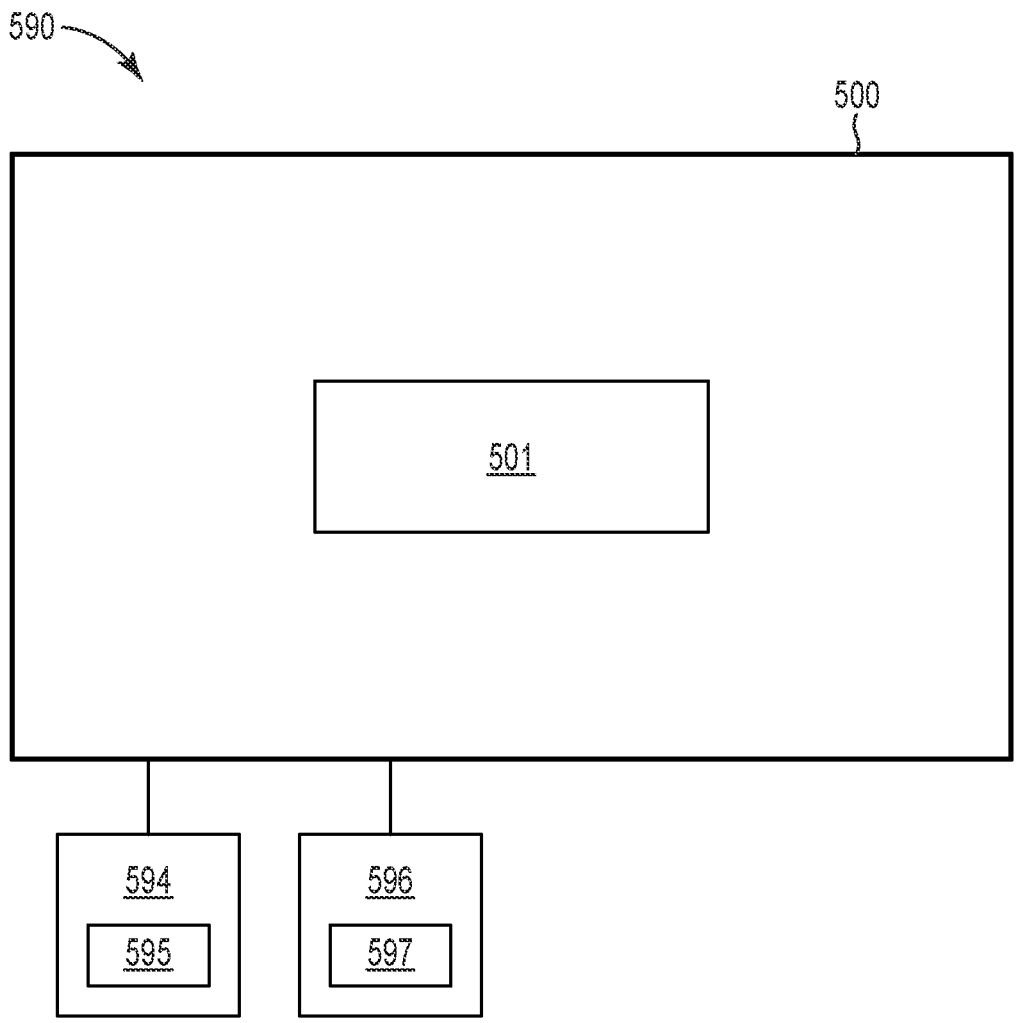
FIG. 5 illustrates a block diagram of a fire alarm system in accordance with an embodiment of the present disclosure.

FIG. 5 illustrates a block diagram of a fire alarm system 590 in accordance with an embodiment of the present disclosure. The system 590 can include a fire sensing device 500, a monitoring device 594, and a computing device 596. Fire sensing device 500 can be, for example, fire sensing device 100 previously described in connection with FIG. 1.

The fire sensing device 500 can include a user interface 501. The user interface 501 can be a graphical user interface (GUI) that can provide and/or receive information to and/or from the user, the monitoring device 594, and/or the computing device 596. In some examples, the user interface 501 can display a message. The message can be displayed responsive to calibrating an IR sensor of fire sensing device 500, failing to calibrate the IR sensor, or predicting an end of life of the IR sensor.

The monitoring device 594 can be a control panel, a fire detection control system, and/or a cloud computing device of a fire alarm system. The monitoring device 594 can be configured to send commands to and/or receive messages from a fire sensing device 500 via a wired or wireless network. For example, the fire sensing device 500 can transmit (e.g., send) the monitoring device 594 a message responsive to calibrating the IR sensor, failing to calibrate the IR sensor, or predicting end of life of the IR sensor.

The monitoring device 594 can receive messages from a number of fire sensing devices analogous to fire sensing device 500. For example, the monitoring device 594 can receive a message from each of a number of fire sensing devices analogous to fire sensing device 500 and create a maintenance schedule based on the messages from each of the number of fire sensing devices.

In a number of embodiments, the monitoring device 594 can include a user interface 595. The user interface 595 can be a GUI that can provide and/or receive information to and/or from a user and/or the fire sensing device 500. The user interface 595 can display messages and/or data received from the fire sensing device 500. For example, the user interface 595 can display a message that the IR sensor requires maintenance, the IR sensor is calibrated, the IR sensor failed to calibrate, and/or the IR sensor is at end of life.

In a number of embodiments, computing device 596 can receive a message from fire sensing device 500 and/or monitoring device 594 via a wired or wireless network. The computing device 596 can be a personal laptop computer, a desktop computer, a mobile device such as a smart phone, a tablet, a wrist-worn device, and/or redundant combinations thereof, among other types of computing devices.

In some examples, a computing device 596 can include a user interface 597 to display messages from the monitoring device 594 and/or the fire sensing device 500. For example, the user interface 597 can display a message that the IR sensor requires maintenance, the IR sensor is calibrated, the IR sensor failed to calibrate, and/or the IR sensor is at end of life.

The networks described herein can be a network relationship through which fire sensing device 500, monitoring device 594, and/or computing device 596 can communicate with each other. Examples of such a network relationship can include a distributed computing environment (e.g., a cloud computing environment), a wide area network (WAN)

such as the Internet, a local area network (LAN), a personal area network (PAN), a campus area network (CAN), or metropolitan area network (MAN), among other types of network relationships. For instance, the network can include a number of servers that receive information from, and transmit information to fire sensing device 500, monitoring device 594, and/or computing device 596 via a wired or wireless network.

As used herein, a "network" can provide a communication system that directly or indirectly links two or more computers and/or peripheral devices and allows a monitoring device 594 and/or a computing device 596 to access data and/or resources on a fire sensing device 500 and vice versa. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get data. Applications may also communicate with network management software, which can interact with network hardware to transmit information between devices on the network.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A fire sensing device, comprising:
a camera configured to capture an image of an environment;
an infrared (IR) sensor; and
a controller configured to:
convert the image from red, green, and blue color space to a number of hue saturation values;
determine whether the image includes an IR body by comparing the number of hue saturation values of the image to a number of hue saturation values of an image without an IR emitting body, wherein the image without the IR emitting body has no radiation;
determine, responsive to determining the image does not include an IR body, the image has no radiation; and
initiate calibration of the IR sensor responsive to determining the image has no radiation.

2. The device of claim 1, wherein the camera is used for flame detection.

3. A method for calibrating a fire sensing device, comprising:
capturing an image of an environment using a camera of the fire sensing device;
converting the image from a red, green, and blue color space to a first number of hue saturation values;
determining whether the image includes an infrared (IR) body by comparing the first number of hue saturation values of the image to a number of hue saturation values of an image without an IR emitting body, wherein the image without the IR emitting body has no radiation;
determining, responsive to determining the image does not include an IR body, the image has no radiation; and
calibrating an IR sensor of the fire sensing device responsive to determining the image has no radiation.

4. The method of claim 3, wherein the image captured by the camera is in the red, green, and blue color space.

5. The method of claim 4, wherein the method includes comparing the first number of hue saturation values to a number of hue saturation values detected by the IR sensor.

6. The method of claim 3, wherein the method includes predicting an end of life of the IR sensor based on calibration frequency of the IR sensor.

7. The method of claim 3, wherein calibrating the IR sensor comprises adding a correction factor to a radiation level of the environment detected by the IR sensor.

8. A fire sensing device, comprising:
a camera configured to capture an image of an environment;
an infrared (IR) sensor; and
a controller configured to:
convert the image from a red, green, and blue color space to a number of hue saturation values;
determine whether the image includes an IR body by comparing the number of hue saturation values of the image to a number of hue saturation values of an image without an IR emitting body, wherein the image without the IR emitting body has no radiation;
determine, responsive to determining the image does not include an IR body, the image has no radiation;
initiate calibration of the IR sensor responsive to determining the image has no radiation; and
predict an end of life of the IR sensor based on calibration frequency of the IR sensor.

9. The device of claim 8, wherein the camera is configured to capture the image of the environment using visible light.

10. The device of claim 8, wherein the controller is configured to generate an alert that the IR sensor is at end of life.

11. The device of claim 10, wherein the controller is configured to transmit the alert.

12. The device of claim 8, wherein the camera is configured to capture an additional image of the environment.

* * * * *